Sept. 10, 1963   NAGATAKE TAKAYA   3,103,628
TACHOMETERS
Filed May 29, 1961
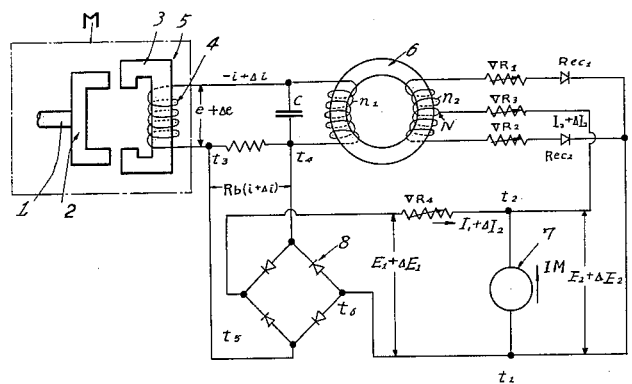
Fig. 1
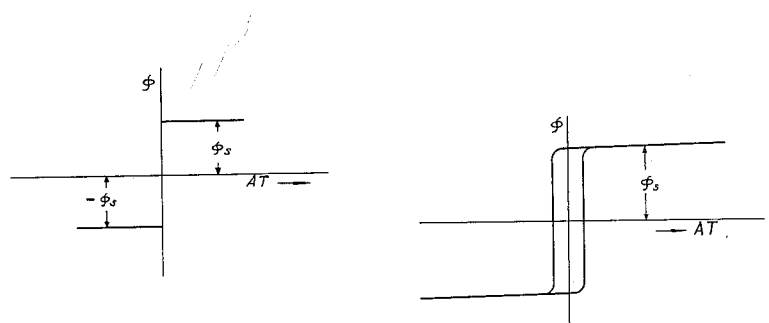
Fig. 2
Fig. 3

United States Patent Office 3,103,628
Patented Sept. 10, 1963

3,103,628
TACHOMETERS
Nagatake Takaya, 3 3-chome, Nishi Ohkubo,
Shinjuku-ku, Tokyo, Japan
Filed May 29, 1961, Ser. No. 113,171
1 Claim. (Cl. 324—70)

My invention relates to a tachometer for measuring number of revolutions of rotating bodies and has its object to provide a new and improved tachometer without utilizing any vacuum tube or transistor, thus eliminating the necessity of providing any source of electric supply or occluded electric source.

More particularly my tachometer is characterized in that a voltage generated by the rotation of a measured body is impressed upon the primary side of a saturation transformer having largest possible rectangular magnetic property, that a resistance element is connected in series with said primary winding, and that the polarity of the secondary current of the saturation transformer which flows through a speed meter connected across the secondary through a rectifier is made opposite to the polarity of a compensating current which flows through said speed meter from opposite terminals of said resistance element via a rectifier circuit.

Further objects and advantages of my invention will become apparent and my invention will be better understood from the following description, reference being made to the accompanying drawing, in which FIG. 1 is a connection diagram of one embodiment of my invention;

FIG. 2 represents the magnetic property of an ideal saturation transformer; and

FIG. 3 represents the magnetic characteristic curve of a practical saturation transformer.

Referring now to the accompanying drawing, there is shown in FIG. 1 a detector M for detecting a number of revolutions comprising a magnetic pole member 2 having magnetic poles which are secured to a rotary shaft 1 to rotate with a measured body (not shown), and a pick-up 5 including a magnetic core 3 mounted in magnetically cooperating relation with said magnetic pole member 2 and a coil 4 wound upon said core 3. One terminal of the coil 4 is connected with one terminal of the primary winding $n_1$ of a saturation transformer 6 having largest possible rectangular magnetic characteristic (rectangular hysteresis characteristic) while the other terminal is connected with the other terminal of the primary winding $n_1$ through a resistor $Rb$ or a resistance element. The opposite terminals of the secondary winding $n_2$ of the saturation transformer 6 are connected with the positive terminal $t_1$ of a direct current volt meter 7 acting as the indicator of number of revolutions, respectively through temperature compensating variable resistors $VR_1$ and $VR_2$ and rectifiers $Rec1$ and $Rec2$ while the intermediate tap N of the secondary winding $n_2$ is connected with the negative terminal $t_2$ of the indicator 7 through a variable resistor $VR_3$. Terminals $t_3$ and $t_4$ of said direct current resistor $Rb$ are connected across the input side of a rectifier bridge 8 with its positive terminal $t_5$ connected with the negative terminal $t_2$ of said indicator 7 for indicating number of revolutions through a variable resistor $VR_4$ and its negative terminal $t_6$ with the positive terminal of said indicator. In the drawing C designates a condenser connected in parallel with the primary winding $n_1$ of the saturation transformer 6 and AT the ampere-turn thereof.

As the rotary shaft 1 revolves with the measured body, according to a principle similar to that of an alternator, an alternating voltage having a frequency $f$ and a magnitude $e$ proportional to the number of revolutions of the measured body will be induced across opposite terminals of the coil 4 of the pick-up 5, which is impressed upon the primary winding $n_1$ of the saturation transformer 6. Assuming now that the saturation transformer 6 has an ideal rectangular hysteresis characteristic as shown in FIG. 2, the voltage $E_2$ induced in the secondary of the saturation transformer 8 would be represented by an equation $$E_2 = 4.44 N_s \Phi_s f \text{ volts}$$

where $N_s$ represents the number of turns of the secondary winding $n_2$, and $\Phi_s$ is the saturation flux. Thus, $E_2$ would be proportional to the frequency $f$ alone and not dependent upon the magnitude $e$ of the voltage impressed upon the primary winding of the saturation transformer. Accordingly the secondary voltage $E_2$ would also be proportional to the frequency $f$ alone and entirely independent upon the strength of the magnet of the magnetic pole member 2 in the detector M for detecting number of revolutions as well as upon the distance between the magnetic pole member 2 and the pickup coil 4. Thus, by rectifying the output of the saturation transformer using the rectifier circuit and then by measuring its voltage by the direct current volt meter, number of revolutions of the measured body can be indicated. However, as a matter of practice, it is impossible to manufacture a saturation transformer having such ideal magnetic characteristic as pointed hereinabove and even with best design the saturation transformer would exhibit a hysteresis characteristic as shown in FIG. 3 which would never saturate completely. Thus, the flux $\Phi_s$ of the saturation transformer 6 cannot maintain constant value as the voltage $v$ of the primary varies with the result that the secondary voltage $E_2$ will be affected in accordance with the voltage variation on the primary side. Assuming now that, in FIG. 1, the primary voltage $e$ were changed to $e + \Delta e$, then the secondary voltage $E_2$ of the saturation transformer 6 would be changed to $E_2 + \Delta E_2$, secondary current $I_2$ to $I_2 + \Delta I_2$ and primary current $i$ of said saturation transformer to $i + \Delta i$. Thus the voltage $Rbi$ between terminals $t_3$ and $t_4$ of the resistor $Rb$ connected in series with the primary winding $n_1$ will become equal to $Rb$ $(i + \Delta i)$ with the result that the voltage $E_1$ across terminals $t_5$ and $t_6$ will become equal to $E_1 + \Delta E_1$ and its current $I_1$ (compensating current) will also become equal to $I_1 + \Delta I_1$ which is then supplied to the indicator 7 through its negative terminal $t_2$ and the rectifier bridge 8. On the other hand said current $I_2 + \Delta I_2$ will flow through the indicator 7 via the variable resistors $VR_1$, $VR_2$, rectifiers $Rec1$, $Rec2$ and the positive terminal $t_1$ whereby the current flowing through said indicator 7 would be represented by $IM = (I_2 + \Delta I_2) - (I_1 + \Delta I_1)$. Therefore, by so adjusting variable resistors $VR_3$, $VR_4$, etc., that $$\Delta_2 - \Delta I_1 = 0$$

then $IM = I_2 - I_1 =$ constant, and the current flowing through the indicator 7, that is indication afforded by its pointer will become independent upon any variation in the voltage generated by the detector M but proportional to the frequency only of the primary voltage or number of revolutions. Condenser C is provided for the purpose of eliminating measurement error caused by the stray capacitance (0.005 µf./20 m.) along the length of a cord interconnecting the detector M and the saturation transformer which is caused by extraordinary increase in the inductance of the saturation transformer as viewed from the primary side, because the saturation transformer has a rectangular magnetic characteristic. If the length of the cord were assumed to be 40 meters from practical point of view, the resonance frequency would become $$fr = \frac{1}{2\pi\sqrt{LC}} \doteq 250 \text{ cycles per second}$$

which is equivalent to 15,000 r.p.m. in terms of number of revolutions. Thus, the resonance frequency caused by the stray capacitance will approach to normal number of revolutions (high speed tachometer) whereby error would be resulted in the indication of number of revolutions where the length of the conductor is varied. In order to prevent this effectively, a condenser C of the magnitude about hundred times larger than the stray capacitance of the conductor is required to be connected in parallel which the stray capacitance so as to eliminate the effect caused by variation in the length of the cord. It will be understood that variable resistors $VR_1$ and $VR_2$ serve to compensate variations in the characteristics of rectifiers $Rec1$ and $Rec2$ caused by temperature change.

As has been described above, in accordance with my invention, I utilize a saturation transformer having a largest possible rectangular magnetic characteristic to measure number of revolutions of the measured body whereby it is possible to provide fault free tachometers of compact and light weight without utilizing any vacuum tube, and hence any source of electric supply, as in the prior art. Moreover, tachometers embodying my invention have high accuracy, sensibility and stability and therefore are especially suitable as high speed tachometers in marine use because slight effect upon the secondary voltage of the saturation transformer caused by voltage variation on its primary side is compensated by current bias of the opposite polarity which is supplied to the secondary side from the primary side.

While I have explained my invention by describing particular embodiment thereof, it will be apparent that improvements and modifications may be made without departing from the scope of my invention as defined in the appended claim.

What I claim as new and desire to secure by Letters Patent of the United States is:

A tachometer device, comprising in combination, generating means to generate an A.-C. voltage having a frequency proportional to the number of revolutions to be measured including shaft means for coupling to a rotating body whose rotational speed is to be measured, a horseshoe magnet with poles at the ends thereof coupled at its center to said shaft means for rotation therewith, and a horseshoe core adjacent to said magnet disposed so as to sense the rotation of the magnet, said rotation generating an A.-C. voltage in said horseshoe core;

a saturable transformer fed by said generating means including a primary winding coupled to said horseshoe core, a secondary winding with two output leads and a magnetic transformer core of the largest possible rectangular magnetic characteristic;

a first resistor connected in series with said generating means and said primary winding;

rectifier and temperature compensating means at each of said secondary winding output leads, a junction point joining said output leads, and a center tap to said secondary winding with temperature compensating means coupled thereto;

D.-C. voltmeter means for indicating said number of revolutions, one side of which is connected to said output leads junction point and the other side being connected to said center tap;

a four leg four junction rectifier bridge connected between said first resistor and said one side of said voltmeter means so that two opposite junctions are connected across said first resistor and a third junction of one polarity is connected to said voltmeter means one side of the opposite polarity;

at least one biasing resistor in series between the fourth junction and the other side of said voltmeter means of a value such that the current in said primary winding is equal to the current in said secondary winding; and, capacitor means in parallel between said generating means and said primary winding to bias out stray capacitance.

References Cited in the file of this patent

UNITED STATES PATENTS

| | | |
|---|---|---|
| 2,285,006 | Bowser | June 2, 1942 |
| 2,900,600 | Gregson | Aug. 18, 1959 |
| 2,908,864 | Shepard | Oct. 13, 1959 |